US008935244B2

United States Patent
Singh et al.

(10) Patent No.: US 8,935,244 B2
(45) Date of Patent: *Jan. 13, 2015

(54) SYSTEM AND METHOD FOR IDENTIFYING A LOCATION OF INTEREST TO BE NAMED BY A USER

(71) Applicant: Scenera Mobile Technologies, LLC, Raleigh, NC (US)

(72) Inventors: Munindar P. Singh, Cary, NC (US); Mona Singh, Cary, NC (US)

(73) Assignee: Scenera Mobile Technologies, LLC, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/041,518

(22) Filed: Sep. 30, 2013

(65) Prior Publication Data

US 2014/0032543 A1    Jan. 30, 2014

Related U.S. Application Data

(63) Continuation of application No. 13/798,410, filed on Mar. 13, 2013, now Pat. No. 8,554,765, which is a continuation of application No. 11/469,124, filed on Aug. 31, 2006, now Pat. No. 8,407,213.

(51) Int. Cl.
G06F 7/00 (2006.01)
G06F 17/30 (2006.01)

(52) U.S. Cl.
CPC ...... *G06F 17/30241* (2013.01); *G06F 17/3087* (2013.01)
USPC ........................................................ 707/727

(58) Field of Classification Search
CPC .......... G06F 17/3087; G06F 17/30241; G06F 17/30867; G06F 17/30; G06F 17/30265; G06F 17/30277
USPC ........................................................ 707/727
See application file for complete search history.

(56) References Cited

U.S. PATENT DOCUMENTS

| 5,493,677 | A | 2/1996 | Balogh et al. |
| 6,122,361 | A | 9/2000 | Gupta |
| 6,275,707 | B1 | 8/2001 | Reed et al. |
| 6,360,101 | B1 | 3/2002 | Irvin |
| 6,374,179 | B1 | 4/2002 | Smith et al. |
| 6,411,724 | B1 | 6/2002 | Valthilingam et al. |

(Continued)

FOREIGN PATENT DOCUMENTS

| JP | 10-271375 | 10/1998 |
| JP | 00-333266 | 11/2000 |

*Primary Examiner* — Truong Vo

(57) ABSTRACT

A mobile communication device for identifying a location to be named comprising a position locator component configured to determine a location of a user and a communication interface component configured to provide the location for use in determining user-specific location information including at least one of a number of times and an amount of time the user is present at or near the location. The location naming component is configured to receive an identification of the location as a location of interest. The location naming component is configured to provide a prompt for naming the location of interest for presentation by a graphical user interface component. The location naming component is configured to receive name information for naming the location. The graphical user interface component is configured to present the name information for the location of interest on the mobile communication device.

18 Claims, 7 Drawing Sheets

(56) References Cited

U.S. PATENT DOCUMENTS

| | | |
|---|---|---|
| 6,546,257 B1 | 4/2003 | Stewart |
| 6,629,104 B1 | 9/2003 | Parulski et al. |
| 6,668,173 B2 | 12/2003 | Greene |
| 6,681,107 B2 | 1/2004 | Jenkins et al. |
| 6,714,791 B2 | 3/2004 | Friedman |
| 6,804,684 B2 | 10/2004 | Stubler et al. |
| 6,831,598 B2 | 12/2004 | Saint-Hilaire et al. |
| 6,850,188 B1 | 2/2005 | Lee et al. |
| 6,885,874 B2 | 4/2005 | Grube et al. |
| 6,920,328 B2 | 7/2005 | Wollrab |
| 6,922,723 B1 | 7/2005 | Sharp et al. |
| 6,947,834 B2 | 9/2005 | Duckeck |
| 6,952,181 B2 | 10/2005 | Karr et al. |
| 6,957,076 B2 | 10/2005 | Hunzinger |
| 6,975,941 B1 | 12/2005 | Lau et al. |
| 6,999,777 B1 | 2/2006 | Ganesh |
| 7,155,456 B2 | 12/2006 | Abbott, III et al. |
| 7,283,827 B2 | 10/2007 | Meadows et al. |
| 7,353,034 B2 | 4/2008 | Haney |
| 7,395,507 B2 | 7/2008 | Robarts et al. |
| 7,512,889 B2 | 3/2009 | Newell et al. |
| 7,533,082 B2 | 5/2009 | Abbott et al. |
| 7,614,001 B2 | 11/2009 | Abbott et al. |
| 2002/0042278 A1 | 4/2002 | Crockett et al. |
| 2002/0052207 A1 | 5/2002 | Hunzinger |
| 2002/0115446 A1 | 8/2002 | Boss et al. |
| 2002/0123373 A1 | 9/2002 | Kirbas et al. |
| 2004/0027624 A1 | 2/2004 | Parulski et al. |
| 2004/0133605 A1 | 7/2004 | Chang et al. |
| 2004/0174434 A1 | 9/2004 | Walker et al. |
| 2004/0194025 A1 | 9/2004 | Hubert et al. |
| 2004/0205482 A1 | 10/2004 | Basu et al. |
| 2004/0248591 A1 | 12/2004 | Fish |
| 2005/0050043 A1 | 3/2005 | Pyhalammi et al. |
| 2005/0091276 A1 | 4/2005 | Brunswig et al. |
| 2005/0192030 A1 | 9/2005 | Asthana et al. |
| 2005/0208954 A1 | 9/2005 | Boss et al. |
| 2005/0234922 A1 | 10/2005 | Parekh et al. |
| 2005/0261822 A1 | 11/2005 | Wako |
| 2005/0288036 A1 | 12/2005 | Brewer et al. |
| 2006/0015925 A1 | 1/2006 | Logan |
| 2007/0032268 A1 | 2/2007 | Gotfried |
| 2007/0067098 A1 | 3/2007 | Zelentsov |
| 2007/0143281 A1 | 6/2007 | Smirin et al. |
| 2007/0288164 A1 | 12/2007 | Gordon et al. |
| 2007/0298812 A1 * | 12/2007 | Singh et al. ............... 455/456.1 |
| 2007/0298813 A1 | 12/2007 | Singh |
| 2008/0139244 A1 | 6/2008 | Vau et al. |
| 2008/0227473 A1 | 9/2008 | Haney |

* cited by examiner

SYSTEM AND METHOD FOR IDENTIFYING A LOCATION OF INTEREST TO BE NAMED BY A USER

CROSS-REFERENCE TO RELATED APPLICATIONS

The present invention is a continuation of co-pending U.S. patent application No. 13/798,410, entitled, "SYSTEM AND METHOD FOR IDENTIFYING A LOCATION OF INTEREST TO BE NAMED BY A USER" which is a continuation of 11/469,124, entitled "SYSTEM AND METHOD FOR IDENTIFYING A LOCATION OF INTEREST TO BE NAMED BY A USER" which is related to co-pending U.S. patent application No. 11/425,650, entitled "METHOD AND SYSTEM FOR PROVIDING A DESCRIPTOR FOR A LOCATION TO A RECIPIENT", and to co-pending U.S. patent application No. 11/425,623, entitled "SYSTEM AND METHOD FOR NAMING A LOCATION BASED ON USER-SPECIFIC INFORMATION", both filed on Jun. 21, 2006, and assigned to the assignee of the present application and herein incorporated by reference.

BACKGROUND

Handheld electronic devices, such as personal digital assistants (PDAs), mobile phones, digital cameras, and the like, offer mobility and a variety of services to their respective users. They are typically configured to transmit and receive data to and from other devices via a wired or wireless connection. Most mobile phones, for example, can provide Internet access, maintain a personal address book, provide messaging capabilities, capture digital images, as well as place phone calls.

Many devices, in particular mobile phones, can identify their respective locations within a certain range depending on the device and location identifying technique. Some devices can use a sophisticated position determining system, such as a Global Positioning System (GPS). The GPS is a satellite-based radio navigation system that uses signals from three or four satellites to compute the current latitude, longitude and elevation of a GPS receiver in the device anywhere on earth down to within a few meters. Other devices can use a location identifying technique based on which base station is servicing the device, that is, the location of the device is within a range of the base station from which a call is made. Other devices can use location identifying techniques based on triangulation between the device and at least two base stations.

The device's location, typically represented by geospatial coordinates, can be used in a variety of ways. For example, geographical information systems (GISs) exist that map geospatial coordinates to street addresses or location names. The street address or name corresponding to the geospatial coordinates can be associated with an image captured by the device at the location and stored as metadata. The metadata can then be used to categorize the image or to remind the user of the location of where the image was captured.

Alternatively, or in addition, the user can associate other information with a location. The other information can be a description of, or a personalized name for, the location. For example, the user can provide a name of a location based on a favorite store, e.g., "Charbucks," at or near that location, or based on a description of an event, e.g., "café where I had lunch with Sally." In this manner, the location name can be personalized and relevant to the user.

Typically, the user can provide a name of a location when the user captures an image or visits the location. Nevertheless, unless the user is prompted to name the location, the user can easily forget, or be too distracted, to provide a name at the time the picture is taken or at the time of the visit. If the user attempts to name the location later, he may have problems remembering the location, and even if the user remembers the location, he may have difficulties specifying it accurately to the device so that it can be used as metadata. On the other hand, if the device prompts the user to name a location every time an image is captured or at every location visited, the user can easily be overwhelmed with prompts to name locations that are of no interest to the user.

SUMMARY

Accordingly, an apparatus and method for identifying a location of interest for a user to name are described. According to one exemplary embodiment, the apparatus includes a monitoring module configured to monitor actions taken by a user via a mobile communication device and to monitor a location of the mobile communication device when an action is taken by the user and at predetermined time intervals, and a data store for storing user-specific location information and user-specific action information associated with the location monitored by the monitoring module. The apparatus also includes a location naming module. According to aspects of one embodiment, the location naming module is configured to calculate a relevance rating of the location based on the user-specific action information associated with the location and on the user-specific location information, and to prompt the user to name the location based on its relevance rating.

According to another exemplary embodiment, a method of identifying a location to be named includes monitoring actions taken by a user via a mobile communication device, and a location of the mobile communication device when an action is taken by the user and at predetermined time intervals and storing user-specific location information and user-specific action information associated with the location monitored in a data store. The method further includes determining a relevance rating of the location based on the user-specific location information and user-specific action information associated with the location, and prompting the user to provide a name for the location based on the relevance rating.

BRIEF DESCRIPTION OF THE DRAWINGS

The accompanying drawings provide visual representations which will be used to more fully describe the representative embodiments disclosed here and can be used by those skilled in the art to better understand the representative embodiments and their inherent advantages. In these drawings, like reference numerals identify corresponding elements, and.

DETAILED DESCRIPTION

Figure 1:
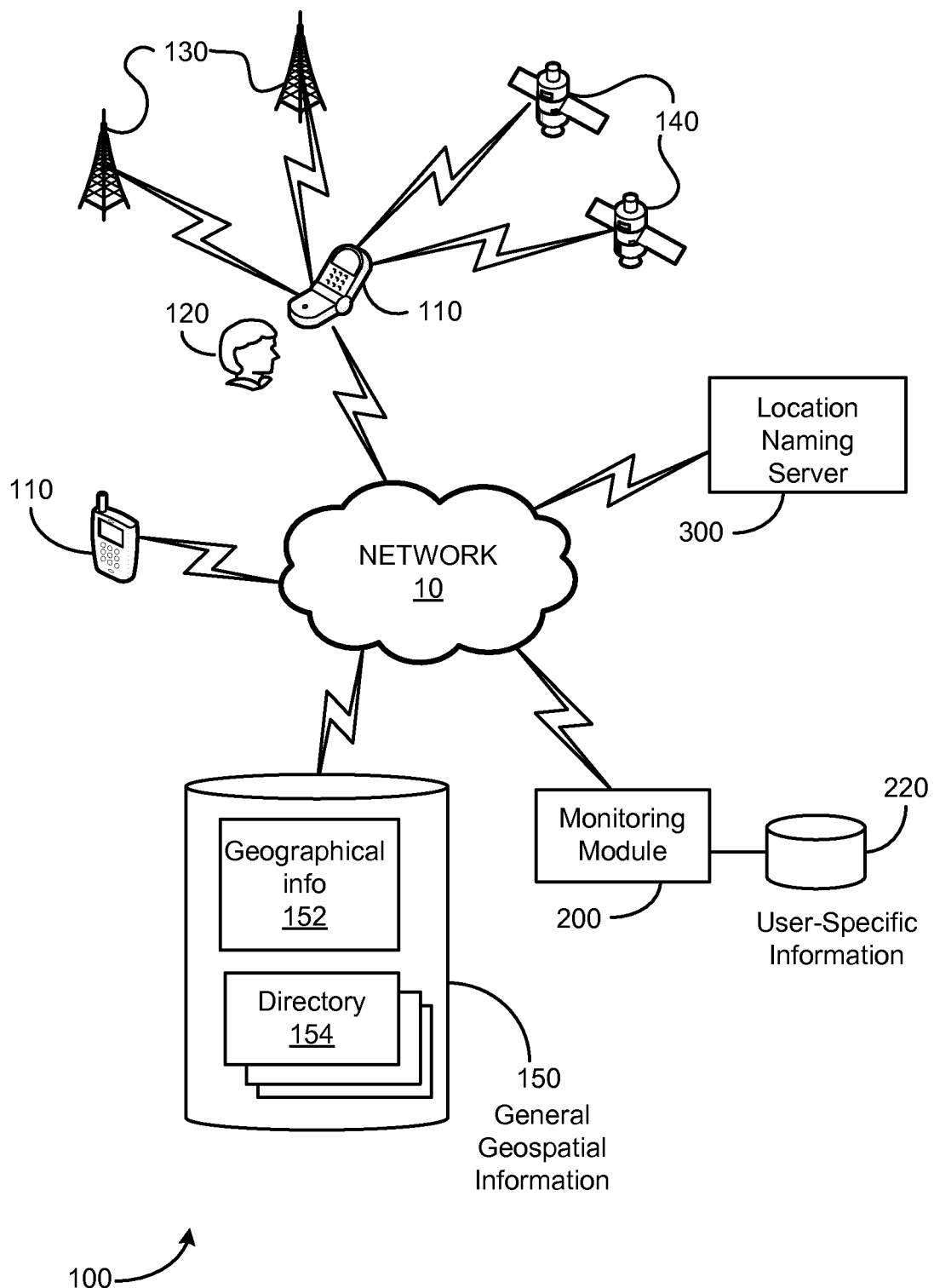
FIG. 1 is a block diagram illustrating an exemplary location naming system according to an exemplary embodiment.

Various aspects will now be described in connection with exemplary embodiments, including certain aspects described in terms of sequences of actions that can be performed by elements of a computing device or system. For example, it will be recognized that in each of the embodiments, at least some of the various actions can be performed by specialized circuits or circuitry (e.g., discrete and/or integrated logic gates interconnected to perform a specialized function), by program instructions being executed by one or more processors, or by a combination of both. Thus, the various aspects can be embodied in many different forms, and all such forms are contemplated to be within the scope of what is described.

According to an exemplary embodiment, a location of potential interest to a user of a mobile communication device is identified based on the user's presence at or near the location and a history of actions performed or taken by the user using the device at or near the location. Actions performed by the user can include interactions with other users using the device. The user's presence at or near the location can be quantified by the number of times the user visits the location and the amount of time the user spends at or near the location. For example, a location may be one of interest if the user is moving in a certain direction and stops for a while or backs up and moves in or around the location. Likewise, if the user stops and spends an amount of time at or near the location, e.g., as in a store or in a restaurant, the location may be of interest.

The history of actions and interactions at or near a location can also be indicative of the location's relevance to the user. For example, if the user has stopped and taken an action, e.g., captured pictures, at or near the location on previous occasions, then the likelihood that the location is one of relative importance increases. Similarly, if the user has initiated several interactions, e.g., phone calls, at or near the location, the relative importance of the location can increase.

According to one embodiment, a location's relevance can be based on the number of times the user performs an action, e.g., captures an image, or an interaction with another user, e.g., initiates a phone call or sends a text message, using the mobile communication device, and on the number of times the user has visited the location and the amount of time the user has spent in the location during a predetermined time interval. The user is then prompted to name those locations that are of highest potential relevance to the user. In this manner, the user is not prompted to name every location visited by the user or every location where the user has performed an action/interaction.

According to one embodiment, the user is prompted to name a location at or near the time the location is identified as one of potential interest so that the user can provide an appropriate name. According to an exemplary embodiment, the prompt can include a message that describes the location based on when the user was last at or near the location and what actions/interactions were taken at or near the location such that the user can decide whether the location is in fact one of interest and deserving of a name. The user can be prompted while the user is using the mobile communication device or within a period of time after the user has performed an action/interaction using the device. When the user provides a name for a location, the name can then be associated with the location and stored so that the name can be retrieved when the user returns to the location.

FIG. 1 is a block diagram illustrating an exemplary arrangement for a location naming system 100 according to an exemplary embodiment. One or more network-enabled mobile communication devices 110, such as a digital camera/phone, PDA, laptop or the like, are in communication with a location naming server 300 over a network 10. A data store 150 includes general geospatial information relating to a plurality of locations and is accessed by the device 110 or the location naming server 300 over the network 10. The general geospatial information 150 is typically public information that can include geographical information 152 that maps the geospatial coordinates to street names and building names and one or more directories 154 that provide other information associated with street addresses.

According to an exemplary embodiment, the system 100 includes means for monitoring actions taken by a user and via a mobile communication device and for monitoring a location of the mobile communication device when an action is taken by the user and at predetermined time intervals, such as a monitoring module 200 that is in communication with the devices 110 and with the location naming server 300 over the network 10. In an exemplary embodiment, the monitoring module 200 is configured to collect information relating to a user's presence at or near a location, and a history of actions, including interactions, by the user 120 using the device 110 at or near the location. The system further includes means for storing user-specific location information and user-specific action information associated with the location monitored by the monitoring module, such as the monitoring module 200, which is configured to store and manage the collected information in a data store 220.

Figure 2A:
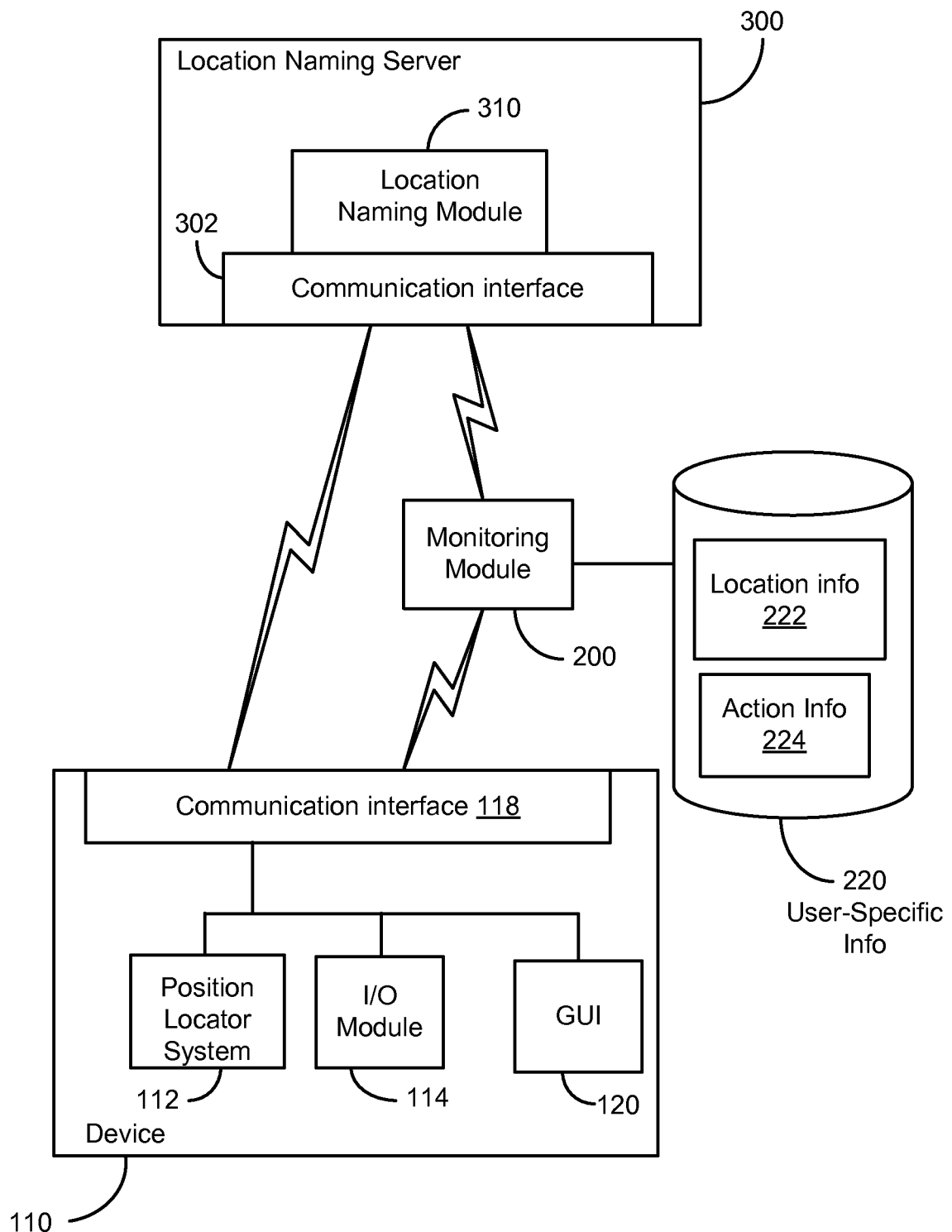
FIG. 2A-2C are more detailed block diagrams illustrating the location naming system according to several exemplary embodiments.

FIG. 2A is a more detailed block diagram of the location naming system 100 according to an exemplary embodiment. Each device 110 includes circuitry that can track a position of the device 110. For example, the device 110 can include a position locator system 112 that tracks the position of the device 110. The position locator system 112 can be the well known global positioning system (GPS) that utilizes satellites 140 (FIG. 1) to determine the device's longitudinal and latitudinal position. Alternatively, the position locator system 112 can be configured to utilize one or more base stations 130 within communication range to determine the device's location. Each mobile communication device 110 also includes circuitry for communicating with the location naming server 300 and monitoring module 200. For example, the device 110 can include a communication interface 118 coupled to a user interface 120 and input/output (I/O) module 114 that allows the user 120 to use the device 110 to communicate with the server 300 over a wireless network 10 using one or more communication protocols.

The monitoring module 200 can be a personal computer or other device capable of collecting, storing and managing data. The monitoring module 200 can include a communication interface (not shown) to receive and transmit data over the network 10. In one embodiment, the monitoring module 200 monitors actions taken by the user 120 using the mobile communication device 110 and monitors the location of the device 110 when actions are taken by the user and at predetermined time intervals. In one embodiment, the monitoring module 200 is configured to collect and maintain user-specific action information 224 that includes the number of times the user 120 performs an action and/or interaction using the device 110 at or near the location during a first predetermined time interval, e.g., one (1) hour. Predetermined time intervals, such as the first predetermined time interval, can include a time period over which the relevance of a location is determined. Such time intervals can be configured by an administrator or user of the system 100, or be set as a default in the various components of the system 100 that determines the relevance of a location. In addition, the monitoring module 200 is configured to collect and maintain user-specific location information 222 that includes short-term presence information including the number of times the user 120 is present at or near the location during the first predetermined time interval and/or the amount of time the user is present at or near the location during the first predetermined time interval. The user-specific location information 222 and the user-specific action information 224 are stored in the data store 220.

The location naming server 300 can be a personal computer or other device capable of processing data. The location naming server 300 includes a communication interface 302 to transmit and receive data over the network 10. In one embodiment, the location naming server 300 is configured to retrieve user-specific information from the data store 220 over the network 10 via the monitoring module 200.

The system 100 further includes means for prompting the user to name the location based on the user-specific action information associated with the location and on the user-specific location information. For example, according to an exemplary embodiment, the location naming server 300 includes a location naming module 310 which is communicatively coupled to the communication interface 302. The location naming module 310 is configured to determine a relevance rating of a location based on the user-specific action information associated with the location and on the user-specific location information. In one embodiment, the location naming module 310 prompts the user 120 to name the location based on its relevance rating.

Figure 2B:
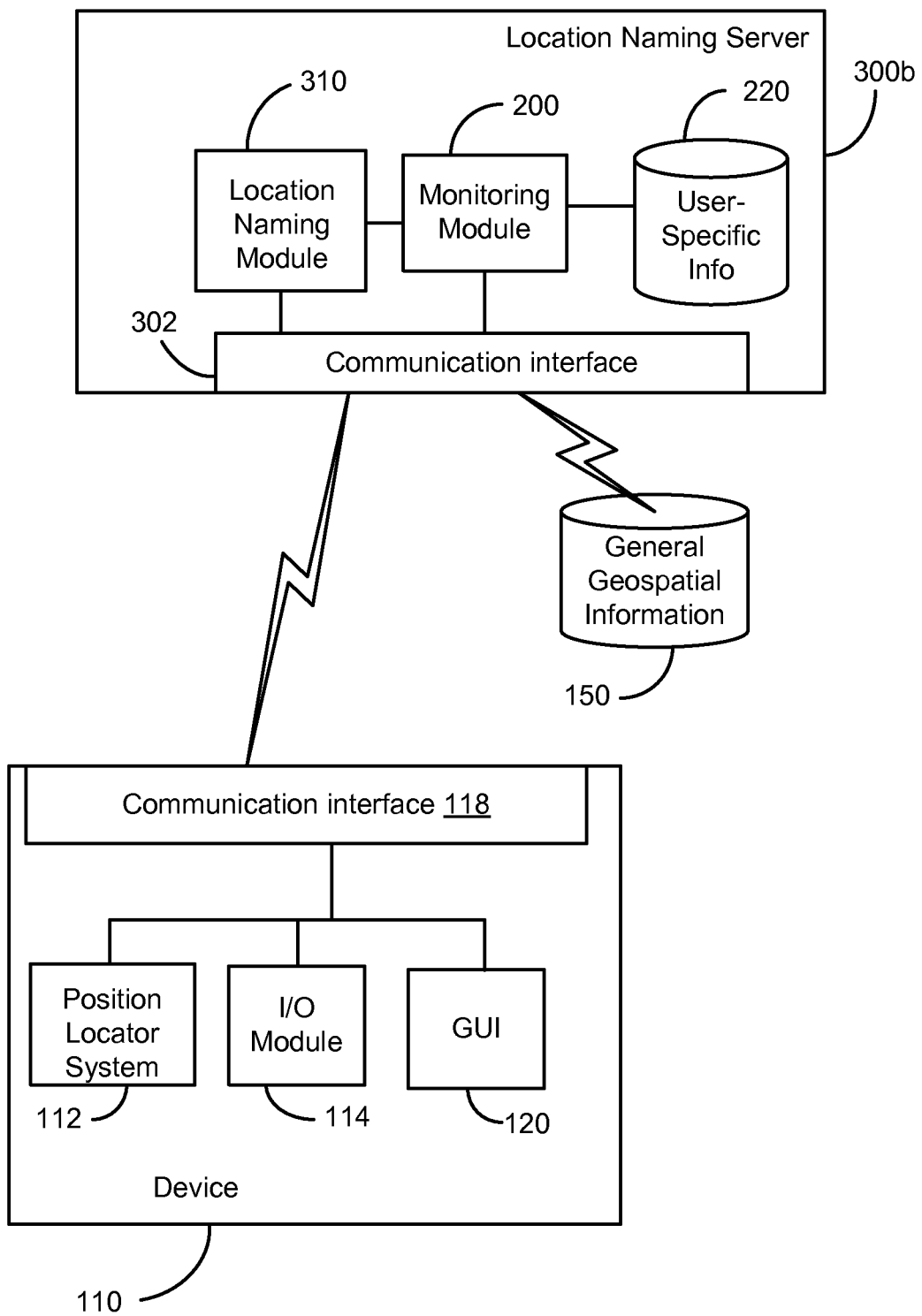

The system 100 illustrated in FIG. 1 and FIG. 2A is but one exemplary arrangement. In this arrangement, a "thin" mobile communication device 110 can be accommodated because the user-specific location information 222 and action information 224 can be stored remotely and the functionality of the monitoring module 200 and the location naming module 310 can be included in separate servers. Other arrangements can be designed by those skilled in the art. For example, in one embodiment shown in FIG. 2B, the functionality of the monitoring module 200 and the data store 220 can be included in the location naming server 300b so that the location naming server 300b securely manages the user-specific information 220.

Figure 2C:
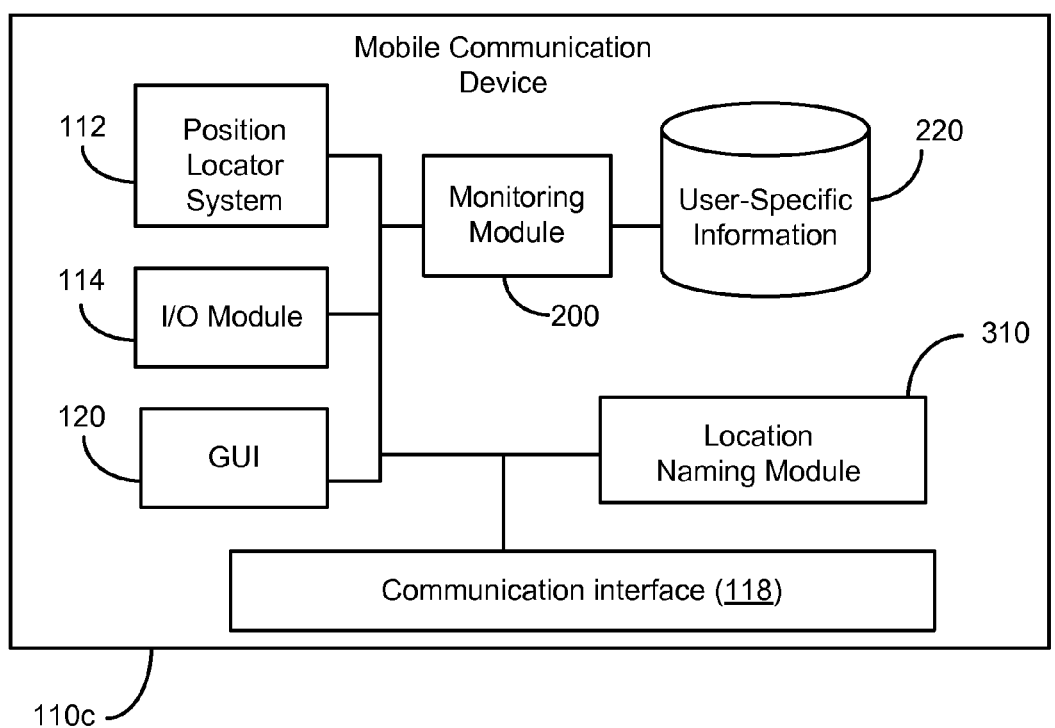

In another embodiment, shown in FIG. 2C, the mobile communication device 110c can perform the functions of the location naming module 310 and the monitoring module 200, and store the user-specific information 220 internally in the device memory (not shown). In this arrangement, the location naming server 300 is not required. Variations of these embodiments may be utilized and structural and functional modifications may be made without departing from the scope of the present disclosure. For example, the functionality of monitoring module 200 can be integrated with that of the mobile communication device 110 and can be configured to transmit the user-specific location information 222 and user-specific action information 224 to the location naming module 310, which stores and manages the information in the data store 220. In this example, the location naming module 310, instead of the monitoring module 200, can manage the information in the data store 220.

Figure 3:
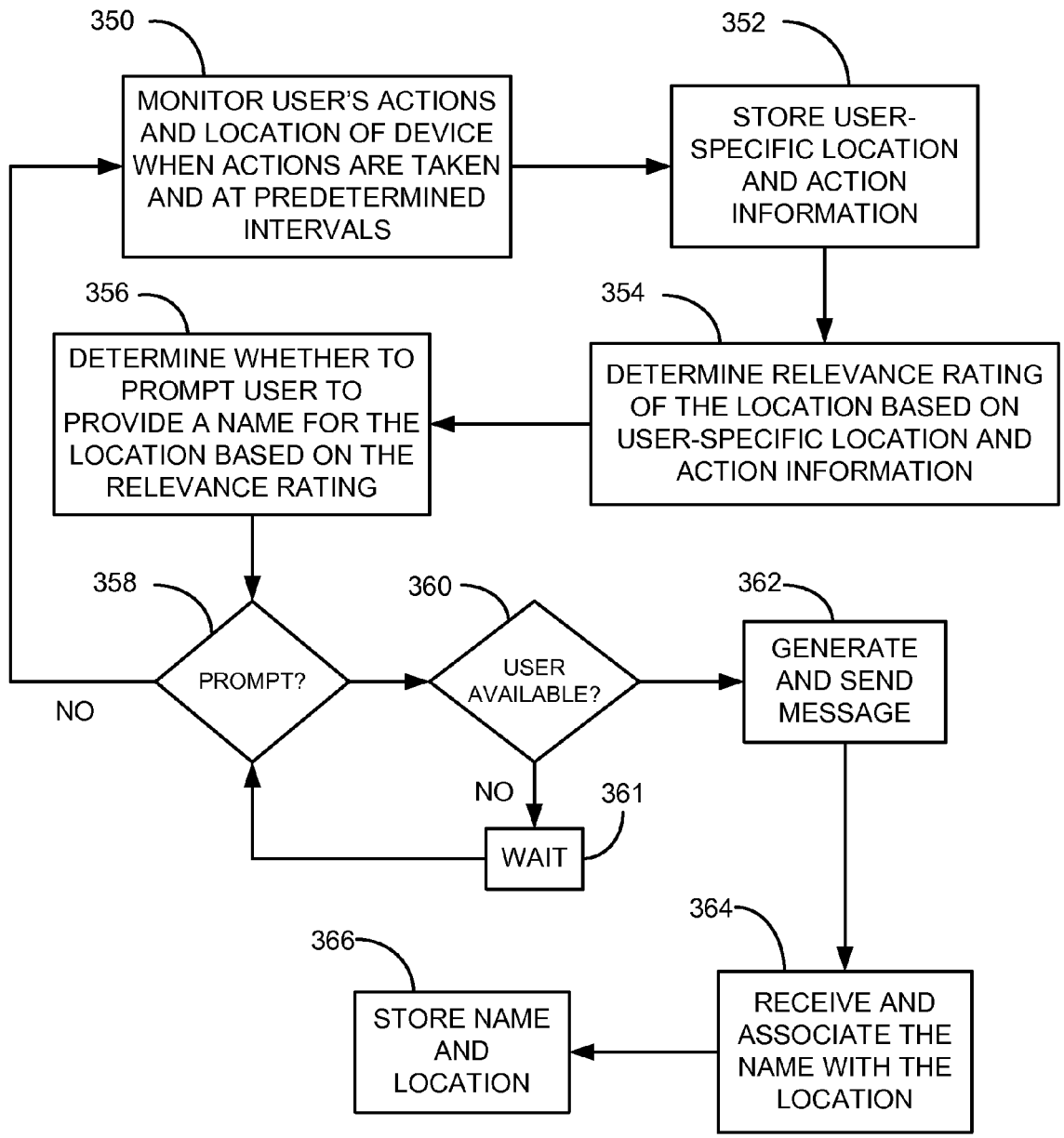
FIG. 3 is a flow diagram illustrating an exemplary process for identifying a location for naming according to an exemplary embodiment.

FIG. 3 is a flow diagram illustrating an exemplary process for identifying a location for naming according to one embodiment. Referring to FIGS. 1, 2A-2C and FIG. 3, the exemplary process begins when the monitoring module 200 monitors actions taken by the user 120 via the mobile communication device 110 and the location of the mobile communication device when the action is taken by the user 120 and at predetermined time intervals (block 350). In one embodiment, a location can be a contiguous region, e.g., a 25 meters by 25 meters square, where different locations do not overlap and where a plurality of contiguous locations define an entire geographical region of interest. The location can be represented by a set of geospatial coordinates, and the user's position can be identified by geospatial coordinates generated by the position locator system 112 in the device 110 or provided by the user 120 via the I/O module 114. The geospatial coordinates of the user/device 110 can be used to identify at least one position at or near the location through the geographical information 202.

In one embodiment, the monitoring module 200 monitors the device's location and collects the user-specific location information 222 by querying the position locator system 112 in the device 110 at a fixed time interval. For example, the monitoring module 200 can collect the user-specific location information 222 every 30 seconds. In another embodiment, the monitoring module 200 can collect the information 222 at a time interval proportional to a velocity of the mobile communication device 110. For example, the time interval can be the 80 divided by the device's velocity. The monitoring module 200 can monitor the user's actions and collect the user-specific action information 224 by querying the position locator system 112 in the device 110 when the user performs an action, e.g., takes a picture, or initiates an interaction, e.g., makes a call or sends a message.

According to an exemplary embodiment, the monitoring module 200 monitors the user's actions and keeps track of the number of times the user 120 performs an action and/or interaction using the device 110 at or near the location during a first predetermined time interval, e.g., one (1) hour. In addition, the monitoring module 200 monitors the device's position and keeps track of the number of times the user 120 is present at or near the location during the first predetermined time interval and/or the amount of time the user is present at or near the location during the first predetermined time interval. This information, referred to above as the user-specific action information 224 and user-specific location information 222, respectively, is stored in the data store 220 (block 352).

Figure 4:
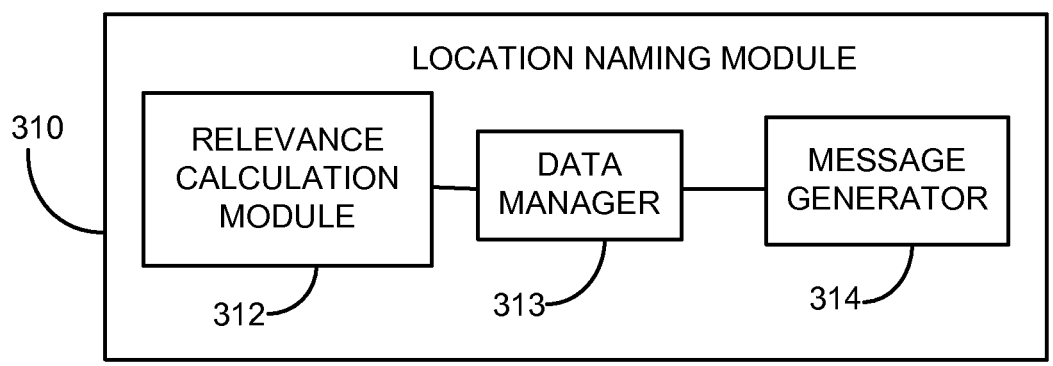
FIG. 4 is a block diagram illustrating an exemplary location naming module according to an exemplary embodiment.

According to an exemplary embodiment, a relevance calculation module 312 in the location naming module 310, shown in FIG. 4, determines a relevance rating for the location based on the user-specific location information 222 and the user-specific action information 224 associated with the location (block 354). According to an exemplary embodiment, the relevance calculation module 312 (or, perhaps, the location naming module 310 itself) can maintain a dynamic list of potentially relevant locations based on the relevance rating for which the user exhibits nonzero short-term presence over the first predetermined interval. With such an arrangement, the user-specific location information 222, including the user's short-term presence information, can be updated at predetermined intervals, (e.g., every 30 seconds), and the user-specific action information 224 can be updated whenever an action (or interaction) using the device 110 takes place.

Figure 5:
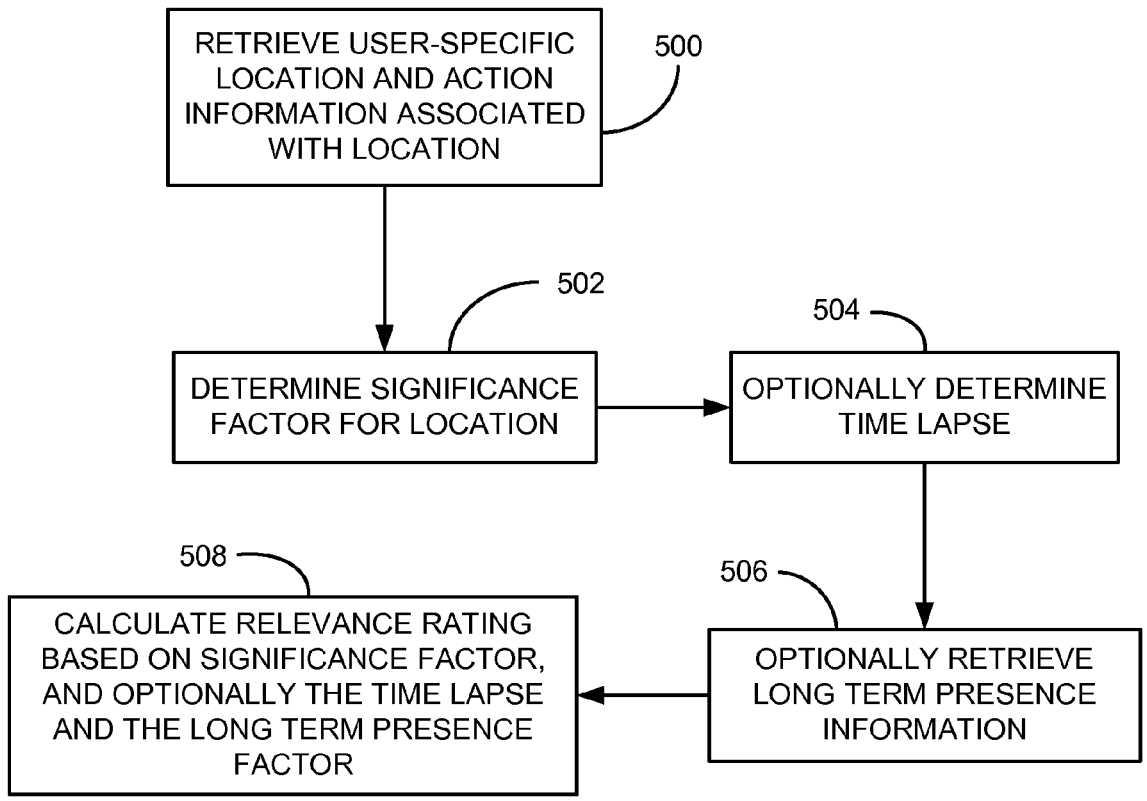
FIG. 5 is a flow diagram illustrating an exemplary process for determining a relevancy rating for a location according to an exemplary embodiment.

FIG. 5 is a flowchart illustrating an exemplary process for determining the relevance rating for the location according to one embodiment. The process begins when the relevance calculation module 312 retrieves the user-specific location 222 and user-specific action 224 information associated with the location from the data store 220 (block 500). In one embodiment, the information 222, 224 can be retrieved via the monitoring module 200. In another embodiment, a data manager 313 in the location naming module 310, shown in FIG. 4, can retrieve the information 222, 224 directly from the data store 220.

Once the information 222, 224 is retrieved, the relevance calculation module 312 can determine a significance factor of the location (block 502). In one embodiment, the significance factor increases as the user-specific location information 222 increases and as the user-specific action information 224 increases. Accordingly, the significance factor of a location increases as the number of times the user is present at or near the location during the first predetermined time interval and/or as the amount of time the user is present at or near the location increases. In addition, the significance factor increases as the number of times the user performs an action and/or interaction with another user using the device 110 at or near the location during the first predetermined time interval increases.

In one embodiment, the significance factor can be a weighted calculation based on the user-specific location information 222 and the user-specific action information 224. In this embodiment, a highest weight can be applied to the number of actions performed, e.g., the number of image capture events, and a lowest weighting to the user-specific location information 222, i.e., the number of times and/or the amount of time the user is present at or near the location during the first predetermined time interval ($N_{present}$). For example, the user-specific action information 224, can be split into its subcomponents corresponding to the number of actions, Nactions, and the number of interactions, Ninteractions, and the significance factor, S, of the location can be determined by the following weighted sum:

$$S = 20 (N_{actions}) + 5 (N_{interactions}) + 1 (N_{present}) \quad \text{Equation (1)}$$

In this embodiment, the higher weighting for the number of actions reflects an assumption that when actions are taken at a particular location, the probability that the location is interesting to the user 120 is high. Similarly, the lowest weighting for the location information reflects the assumption that the user's presence at or near a location is not necessarily indicative of the location's relevance to the user 120. In other embodiments, the weighting can be adjusted to reflect different assumptions regarding the user's behavior.

According to one embodiment, the location's relevance rating can be calculated based on the significance factor alone (block 508). In one embodiment, the relevance rating is directly proportional to the significance factor, i.e., it increases as the significance factor of the location increases.

According to another embodiment, the location relevance rating can be affected by other factors, such as a user's long-term presence information and the amount of time that has passed since the user's last visit to the location. In one embodiment, the relevance calculation module 312 can determine a time lapse between the current time and the last time the user was present at or near the location (block 504) and retrieve the number of times the user 120 was present at or near the location during a second predetermined time interval that is greater than the first predetermined time interval (block 506). In one embodiment, the second predetermined time interval can be a long term period relative to the first predetermined time interval, which is a short term period. For example, the long term period can be one (1) month or one (1) year, while the short term period can be one (1) hour.

According to this embodiment, the relevance rating of the location can be calculated from the significance factor, the time lapse ($t_{lapse}$) and/or the long term presence information ($N_{long\ term}$) (block 508). In one embodiment, the relevance rating is directly proportional to the significance factor, and inversely proportional to the time lapse and to the long term presence information. That is, the relevance rating decreases as either or both of the time lapse and the long term presence information increases. In one embodiment, the relevance rating, R, can be calculated using the following equation:

$$R = S \left[ (1 + t_{lapse}) (\log (2 + N_{long\ term})) \right]^{-1} \quad \text{Equation (2)}$$

The inverse relationship reflects the assumption that as the amount of time increases between the current time and the last time the user 120 was present at or near the location, the relevancy of the location to the user 120 decreases. Similarly, as the number of times the user 120 is present at or near the location over a long term period increases, the more likely that the location is a routine destination and not one of particular interest to the user 120.

Referring again to FIG. 3, once the relevance rating of the location is determined (block 354), the location naming module 310 determines, based on the relevance rating, whether to prompt the user 120 to provide a name for the location (block 356). In one embodiment, the location naming module 310 compares the relevance rating of the location to a threshold value, and if the relevance rating is greater than or equal to the threshold value, the user 120 will be prompted. For example, if the relevance rating is based on the significance factor only, and the significance factor is calculated according to the weighting in Equation (1) above, then when the threshold value is set at 10, a single action (weighted at 20), or two (2) interactions, or 10 presence observations will result in the relevance rating exceeding the threshold.

If the location naming module 310 determines that the user 120 should not be prompted to name the location (block 358) because, for example, the relevance rating does not exceed the threshold value, the process returns to the monitoring the user's actions and the device's location (block 350). Otherwise, the location naming module 310 determines that the user 120 should be prompted to name the location. In one embodiment, the location naming module 310 first determines whether the user 120 is available to receive the prompt (block 360). In one embodiment, the user 120 is available when she is actively using the mobile communication device 110 or has recently used the device 110 within a specified time period, e.g., 10 seconds. In one embodiment, the location naming module 310 can call the monitoring module 200 to make this determination. If the user 120 is using or has recently used the device 110, e.g. taking pictures or sending messages to others, the location naming module 310 can send a message to the user during use or immediately after the user 120 has stopped actively using the device 110 (block 362). Otherwise, the location naming module 310 can wait until the user 120 is available (block 361).

Figure 6:
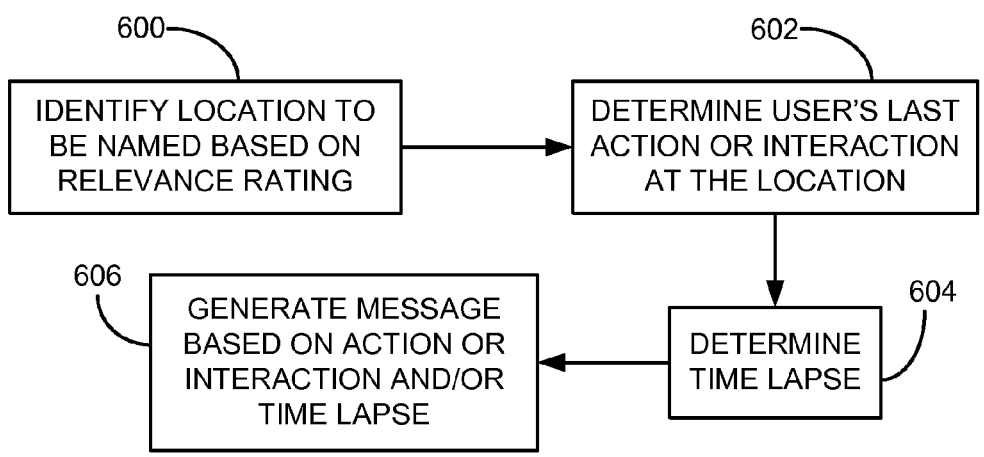
FIG. 6 is a flow diagram illustrating an exemplary process for generating a message according to an exemplary embodiment.

In an exemplary embodiment, the message describes the location based on the user's most recent actions at or near the location and/or a time when the user 120 was last present at or near the location, and prompts the user 120 to name the location. In one embodiment, the location naming module 310 can call a message generator 314, shown in FIG. 4, to compose the message. FIG. 6 is a flowchart illustrating an exemplary process for composing the message according to one embodiment. The message generator 314 identifies the location to be named based on the relevance rating (block 600) and then determines the user's last action and/or interaction at or near the location (block 602). In one embodiment, the message generator 314 retrieves the user-specific action information 224 from the data store 224 directly using the data manager 313, or via the monitoring module 200. The message generator 314 then determines a time lapse between the current time and the last time the user 120 was present at or near the location (block 604). In addition, the message generator 314 can also retrieve general geospatial information 150 from the network 10 to describe the location.

After collecting this information, the message generator 314 generates the message based on at least one of the action and interaction information and the time lapse (block 606). In one embodiment, the message generator 314 is configured to generate messages that are meaningful to the user 120. For example, the following are exemplary messages:

The place about 100 feet North where you turned back

The intersection of 8$^{th}$ Avenue and 35$^{th}$ Street, about a block back

The place where you stood in Times Square 10 minutes ago

The place in Times Square where you stopped this time and on your last visit to New York In an exemplary embodiment, the message can be generated using a template that is completed according to the information retrieved. For example, if the user 120 performed an action/interaction at the location and the location is the latest position where the specified type of action was performed by the user 120, then a description can be generated by filling a template as follows:

Where you last took a picture (and showing a thumbnail of the picture if possible); or Where you last sent a reminder (and showing a part of the reminder notification) If the location is not the latest position where the specified type of action was performed or if the time lapse exceeds a minimum time period, e.g., 5 minutes, then description can be generated by filling a template as follows:

Where you took a picture <time-lapse> ago [and showing a thumbnail of the picture if possible]

In another embodiment, the message generator 314 can use a time template to generate the message. For example, the following guidelines can be implemented:

If 0<time-lapse <2 minutes then, the describe time using "just"—E.g., Where you "just" took a picture If 2 minutes <time-lapse <10 minutes (inclusive), then describe time as "<time-lapse> minutes ago"—E.g., Where you took a picture "8 minutes ago."

If 10 minutes <time-lapse <59 minutes (inclusive), then describe time as "about X minutes ago" where X is the time-lapse in minutes rounded to the nearest 5 minutes—E.g., Where you took a picture "about 25 minutes ago."

60 minutes <time-lapse <1 day (inclusive), then describe time as "at about Y" where Y is the local time at the location rounded to the nearest half hour—E.g., Where you took a picture "at about 11:30 AM." In addition, terms such as "this" or "last" or "today" or "yesterday" or "morning" or "afternoon" or "night" can be used together or singularly.

If the user 120 has performed several actions or participated in interactions at or near the location, the message generator 314 can generate a message that summarizes the actions. In one embodiment, the time descriptor can cover a time period so that the description sounds natural. For example:

Where you took 5 pictures 20-25 minutes ago;

Where you sent 3 emails from 3:30 to 4:10 PM today.

Referring again to FIG. 3, after the location naming module 310 generates the message, it sends it to the mobile communication device 110 associated with the user 120 (block 362). In one embodiment, the message can prompt the user 120 to name two or more locations when more than one location satisfies the criteria for prompting. In this embodiment, the location naming module 310 can generate a list where the locations are ordered according to their respective relevance ratings, and send the list in the message to the device 110. In another embodiment, the message can prompt the user 120 to name the location with the highest relevance rating.

In one embodiment, the device 110 receives the message via the communication interface 118 and the message is displayed to the user 120 on the device's user interface 120. The user 120 can provide a name for the location. In one embodiment, the user 120 can utilize the system and method described in co-pending patent application Ser. No. 11/425,623, entitled "METHOD AND SYSTEM FOR NAMING A LOCATION BASED ON USER-SPECIFIC INFORMATION," filed Jun. 21, 2006, and assigned to the assignee of the present invention. Here, a name generation module automatically provides a name of a location based on an atemporal correlation between general information and user-specific information relating to the location. Because the name for the location is based on user-specific information, the name can be meaningful to the user. The user is not required to think of and to enter a name for each location, which can be tedious when several locations need to be named and when the most appropriate name might not be readily apparent to the user. Once the name has been provided, the user 120 can send the name and location back to the location naming module via the communication interface 118.

According to an exemplary embodiment, the location naming module 310 receives the name over the network 10 via the communication interface 302 and associates the name with the location (block 364). The name and the location are then stored in the data store 220 (block 366) so that the name can be retrieved when the user 120 returns to the location or when the user wishes to share the name with another user. For example, the name for the location can be shared with another user via the system and method described in co-pending patent application Ser. No. 11/425,650, entitled "METHOD AND SYSTEM FOR PROVIDING A DESCRIPTOR FOR A LOCATION TO A RECIPIENT," assigned to the assignee of the present and filed Jun. 21, 2006.

The executable instructions of a computer program as illustrated in FIG. 3, FIG. 5 and FIG. 6 can be embodied in any computer readable medium for use by or in connection with an instruction execution system, apparatus, or device, such as a computer based system, processor containing system, or other system that can fetch the instructions from the instruction execution system, apparatus, or device and execute the instructions.

As used here, a "computer readable medium" can be any means that can contain, store, communicate, propagate, or transport the program for use by or in connection with the instruction execution system, apparatus, or device. The computer readable medium can be, for example, but is not limited to, an electronic, magnetic, optical, electromagnetic, infrared, or semiconductor system, apparatus, device, or propagation medium.

More specific examples (a non-exhaustive list) of the computer readable medium can include the following: a wired network connection and associated transmission medium, such as an ETHERNET transmission system, a wireless network connection and associated transmission medium, such as an IEEE 802.11(a), (b), or (g) or a BLUETOOTH transmission system, a wide-area network (WAN), a local-area network (LAN), the Internet, an intranet, a portable computer diskette, a random access memory (RAM), a read only memory (ROM), an erasable programmable read only memory (EPROM or Flash memory), an optical fiber, a portable compact disc (CD), a portable digital video disc (DVD), and the like.

It will be appreciated by those of ordinary skill in the art that the concepts and techniques described here can be embodied in various specific forms without departing from the essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for identifying a location to be named, the method comprising:
   determining a location of a user via a mobile communication device;
   providing the location of the user for use in determining user-specific location information including at least one of a number of times the user is present at or near the location and an amount of time the user is present at or near the location;
   receiving an identification of the location as a location of interest, wherein the location is identified as the location of interest based on the user-specific location information;
   providing, based on receiving the identification of the location as the location of interest, a prompt for naming the location of interest, the prompt provided for presentation;
   receiving name information for naming the location; and
   presenting the name information for the location of interest on the mobile communication device.

2. The method of claim 1 wherein receiving an identification of the location as the location of interest comprises receiving an indication from a server that the location is the location of interest.

3. The method of claim 1 wherein receiving an identification of the location as the location of interest comprises determining, by the device, that the location is the location of interest.

4. The method of claim 1 wherein receiving name information includes receiving a selection of suggested name information.

5. The method of claim 1 wherein receiving name information includes receiving user-entered text information.

6. The method of claim 1 further comprising presenting information identifying at least one of the number of times the user is present at or near the location and the amount of time the user is present at or near the location.

7. The method of claim 1 further comprising:
   determining an action taken by the user via the mobile communication device; and
   providing information identifying the action taken by the user for use in determining user-specific action information.

8. The method of claim 7, wherein the location is identified as the location of interest based on the user-specific location information and the user-specific action information.

9. The method of claim 1 wherein providing the location of the user includes transmitting the location of the user to a server.

10. A mobile communication device for identifying a location to be named, the mobile communication device comprising:
    a position locator component configured to determine a location of a user via a mobile communication device;
    a communication interface component configured to provide the location of the user for use in determining user-specific location information including at least one of a number of times the user is present at or near the location and an amount of time the user is present at or near the location;
    a location naming component configured to receive an identification of the location as a location of interest, wherein the location is identified as the location of interest based on the user-specific location information, and configured to provide, based on receiving the identification of the location as the location of interest, a prompt for naming the location of interest;
    a graphical user interface component configured to present the prompt;
    the location naming component configured to receive name information for naming the location; and
    the graphical user interface component configured to present the name information for the location of interest on the mobile communication device.

11. The mobile communication device of claim 10 wherein the communication interface is configured to receive an identification of the location as the location of interest from a server and provide the indication to the location naming module.

12. The mobile communication device of claim 10 wherein the location naming component is configured to determine that the location is the location of interest.

13. The mobile communication device of claim 10 wherein the location naming component is configured to receive a selection of suggested name information.

14. The mobile communication device of claim 10 wherein the location naming component is configured to receive name information comprising user-entered text information.

15. The mobile communication device of claim 10 wherein the graphical user interface component is configured to present information identifying at least one of the number of times the user is present at or near the location and the amount of time the user is present at or near the location.

16. The mobile communication device of claim 10 further comprising:
    a monitoring module configured to determine an action taken by the user via the mobile communication device; and
    the communication interface is configured to provide information identifying the action taken by the user for use in determining user-specific action information.

17. The mobile communication device of claim 16, wherein the location naming component is configured to identify as the location of interest based on the user-specific location information and the user-specific action information.

18. A non-transitory computer readable medium containing programming instructions for identifying a location to be named, the program instructions for performing a method comprising:
    determining a location of a user via a mobile communication device;
    providing the location of the user for use in determining user-specific location information including at least one of a number of times the user is present at or near the location and an amount of time the user is present at or near the location;
    receiving an identification of the location as a location of interest, wherein the location is identified as the location of interest based on the user-specific location information;
    providing, based on receiving the identification of the location as the location of interest, a prompt for naming the location of interest, the prompt provided for presentation;

receiving name information for naming the location; and
presenting the name information for the location of interest on the mobile communication device.

* * * * *